US010073481B2

(12) United States Patent
Wagner et al.

(10) Patent No.: US 10,073,481 B2
(45) Date of Patent: Sep. 11, 2018

(54) LOAD CONTROL DEVICE

(71) Applicants: Patrick Reed, Spokane, WA (US); Joerg Wagner, Kelowna (CA); Corey Wagner, Kelowna (CA)

(72) Inventors: Joerg Wagner, Kelowna (CA); Corey Wagner, Kelowna (CA)

( * ) Notice: Subject to any disclaimer, the term of this patent is extended or adjusted under 35 U.S.C. 154(b) by 216 days.

(21) Appl. No.: 14/900,784

(22) PCT Filed: Jun. 24, 2014

(86) PCT No.: PCT/US2014/043919

§ 371 (c)(1),
(2) Date: Dec. 22, 2015

(87) PCT Pub. No.: WO2014/210038

PCT Pub. Date: Dec. 31, 2014

(65) Prior Publication Data

US 2016/0154416 A1 Jun. 2, 2016

Related U.S. Application Data

(60) Provisional application No. 61/839,101, filed on Jun. 25, 2013.

(51) Int. Cl.

| | |
|---|---|
| ***G05B 15/02*** | (2006.01) |
| ***G05F 1/66*** | (2006.01) |
| ***H05B 37/02*** | (2006.01) |
| ***H04L 12/28*** | (2006.01) |

(52) U.S. Cl.
CPC ............... *G05F 1/66* (2013.01); *G05B 15/02* (2013.01); *H04L 12/282* (2013.01); *H04L 2012/2841* (2013.01)

(58) Field of Classification Search
CPC ... H05B 39/088; H05B 39/086; H05B 39/085
See application file for complete search history.

(56) References Cited

U.S. PATENT DOCUMENTS

| | | | | |
|---|---|---|---|---|
| 5,898,130 | A | 4/1999 | Tansi et al. | |
| 2009/0184652 | A1* | 7/2009 | Bollinger, Jr. ....... | H01Q 1/1221 315/246 |
| 2010/0055930 | A1 | 3/2010 | Yue et al. | |
| 2012/0001488 | A1 | 1/2012 | Puschnigg et al. | |
| 2012/0308402 | A1 | 12/2012 | Le et al. | |
| 2013/0010018 | A1 | 1/2013 | Economy | |
| 2013/0109219 | A1* | 5/2013 | Liao .................... | H01R 13/743 439/345 |

* cited by examiner

*Primary Examiner* — Raj R Gupta
(74) *Attorney, Agent, or Firm* — Timberline Patent Law Group

(57) ABSTRACT

Representative implementations of devices and techniques provide local and/or remote control for an appliance. A load control device includes local controls and also includes communication components for remote operations. In one implementation, the load control device is configurable for use with a variety of appliances based on interchangeable sleeves that adapt the load control device to power leads having different configurations.

9 Claims, 16 Drawing Sheets

204
602
502
504
204
602
104
502
504
202

202
104
204
106
102
204
104
202
102
106
100
204
A

LOAD CONTROL DEVICE

PRIORITY CLAIM AND CROSS-REFERENCE TO RELATED APPLICATION

This application claims the benefit under 35 U.S.C. § 119(e)(1) of U.S. Provisional Application No. 61/839,101, filed Jun. 25, 2013, and of PCT International Application No. PCT/US14/043919, filed Jun. 24, 2014, both of which are hereby incorporated by reference in their entirety.

BACKGROUND

Remote control of appliances, such as lamps or fans, for example, often includes turning the appliance power on or off with a timer, remote switching device, or the like. In some cases, this is done by switching the power at the outlet feeding the appliance, or by switching the power coming from the outlet. For example, a timer or switching device may be plugged into the outlet, and the appliance may be plugged into the timer or switching device. Alternately, the switching device may include dimming capability via a remote component. However, many such applications result in multiple cords associated with a single appliance.

Home automation devices may also be plugged into a power outlet, and desired appliances plugged into receptacles in these devices. The home automation devices may be controlled remotely to switch the power to the connected appliance(s).

In many cases, however, direct local use of a remotely controlled appliance may be less convenient or even problematic, since a user may need access to the remote control to operate the appliance. For instance, instead of a user simply sitting down in a favorite reading chair and switching on the adjacent table lamp, the user may need access to a remote control unit that is misplaced, or may need to use a multi-functional control panel, a television display interface, a smartphone application, or the like. Further, a user that is unaware of the remote control (such as in a hospitality situation, for example) may inadvertently switch off the appliance at the built-in switch of the appliance itself, and lose remote control of the appliance as well.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations and photos of the figures are for example, and other shapes and or dimensions may be used and remain within the scope of the disclosure, unless specified otherwise.

DETAILED DESCRIPTION

Introduction

Figure 1:
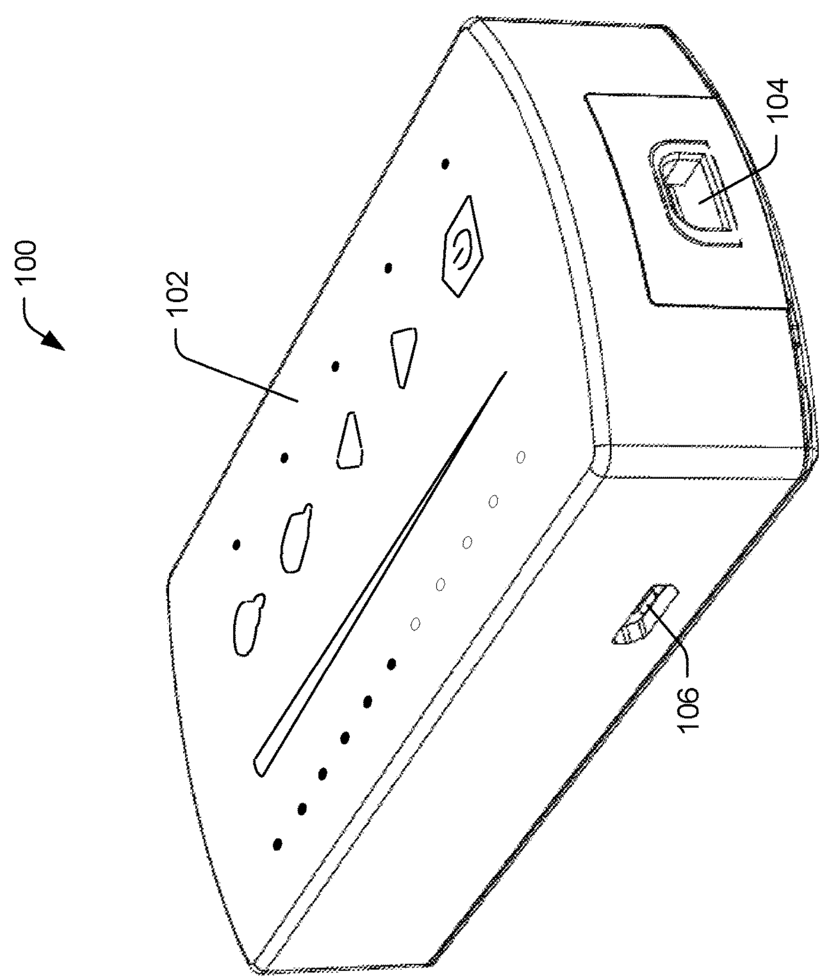
FIG. 1 is a perspective view of an example load control device assembly, according to an embodiment.

An example load control device ("dimmer"), such as a lamp dimmer, is described, according to various embodiments. In an implementation, the dimmer includes one or more provisions for a user to adjust a variable load, such as dim the intensity of a lamp, for example. In various implementations, the load to be controlled may be local, i.e., connected to the dimmer or remote to the dimmer. In some implementations, the dimmer may be arranged to control the intensity of multiple variable or non-variable loads, including a local, i.e., connected, appliance and one or more remote appliances.

In one embodiment, the dimmer is capable of being used to function both as a stand-alone (i.e., the user manipulates the dimmer via the dimmer's user interface) or in conjunction with an automation system or other remote control which is also capable of remotely and/or automatically controlling or adjusting the intensity of the one or more local and/or remote appliances. For example, the dimmer may be a component of a home automation system (such as Control4, for example), or the like. In addition to controlling a local directly coupled device, the dimmer may control additional variable loads or groups of loads.

In another implementation, the user interface of the dimmer may include a capacitive touch interface instead of or in addition to mechanical sliders or mechanical buttons. Whereas in a mechanical button arrangement the user has to press and hold an up or down button to change intensity, in a capacitive touch arrangement the user can directly touch the intensity level desired and/or slide a finger to an infinitely variable desired intensity.

In another implementation, the dimmer may be mounted within (or as part of) an appliance. In a further implementation, the dimmer may be mounted inline (in series with) a power cord of the appliance. For example, the dimmer may be installed by cutting the power cord (near the appliance, for example) and coupling the dimmer to the cut ends of the power cord. In such an embodiment, the dimmer may be used to control the appliance both locally at the appliance and also via remote and/or automated control via the same dimmer.

In various implementations, the dimmer may be retro-fit to an existing appliance, or coupled to a new appliance when manufactured. In an embodiment, the dimmer includes one or more interchangeable sleeve modules (i.e., adapters) arranged to couple the dimmer to any of various types of power leads. For example, the appropriate sleeve module may be selected based on the type or design of the power lead. In the example, the selected sleeve module(s) may be coupled to the dimmer via a port (e.g., socket), for instance, that is configured to receive any of the interchangeable sleeves.

In an implementation, the sleeve modules are arranged to position or align a power lead inserted into the sleeve such that the power lead makes a secure electrical and physical connection to the dimmer. In one example, the power lead is coupled to electrical terminal pins based on selecting the sleeve module associated with the type or design of power lead, and inserting the power lead into a receptacle (i.e., a cavity, an opening, etc.) of the sleeve. In another example, one or more plungers physically secure the power lead to the sleeve (or to the enclosure) through a compression of the plunger(s) onto the power lead.

Various implementations and arrangements are discussed with reference to electrical and electronics components and varied carriers. While specific components (i.e., integrated circuits, electrical components, etc.) are mentioned and illustrated, this is not intended to be limiting, and is for ease of discussion and illustrative convenience. The techniques and devices discussed are applicable to a dimmer having any type or number of electrical components, circuits (e.g., integrated circuits, analog circuits, digital circuits, mixed circuits, ASICS, memory devices, processors, etc.), groups of components, packaged components, structures, and the like. Additionally, the techniques and devices discussed with reference to printed circuit boards (PCBs) are applicable to other types of carriers (e.g., board, chip, wafer, substrate, package, container, can, module, etc.) that components or circuits may be mounted fully or partially on or within.

Implementations are explained in more detail below using a plurality of examples. Although various implementations and examples are discussed here and below, further implementations and examples may be possible by combining the features and elements of individual implementations and examples.

Example Dimmer Assembly

The following description refers to the drawings shown in FIGS. 1-15. Several embodiments of dimmers 100 are described. Descriptions of the embodiments (including notes on the drawings) may include examples of materials, types of fabrication, and dimensions. However, the descriptions are for ease of understanding and are not intended to be limiting. Other suitable materials, types of fabrication, and dimensions may be used to construct a dimmer 100 without departing from the scope of this disclosure.

FIG. 1 is a perspective view of an example dimmer assembly ("dimmer") 100, according to an embodiment. The explanations and illustrations discuss a lamp dimmer as an example. As mentioned above, the use of the term "dimmer" includes any and all controllers, switches, and the like, that are arranged to adjust an intensity of a variable load (e.g., lamp, fan, motor, heater, etc.) including switching the load fully on or off.

The techniques, components, and devices described herein with respect to the dimmer 100 are not limited to the illustrations in FIGS. 1-15, and may be applied to other designs, types, arrangements, and constructions including other electrical components without departing from the scope of the disclosure. In some cases, alternative components may be used to implement the techniques described herein. In various implementations, the dimmer 100 may be a stand-alone module, or it may be a portion of a system, component, structure, or the like.

As shown in FIG. 1, in an implementation, the dimmer 100 includes a user interface (UI) portion 102 arranged receive user input and to initiate one or more control signals based on the user input. For example, the user may select one or more appliances (e.g., lamps, heaters, curtains, do-not-disturb indicators, etc.) to be turned on, turned off, adjusted in intensity, or the like, via the UI 102. In various embodiments, the UI 102 may include a capacitive touch panel and/or other types of buttons, switches, sliders, actuators, and so forth. Additionally, the UI 102 may include one or more indicators arranged to display a status of the appliance(s) controlled by the dimmer 100, a dimming level, or other information.

In an implementation, the UI 102 may be customized for a preselected or desired configuration. For example, the UI 102 may be customized to include actuators, indicators, and the like for various applications and/or feature levels.

In an implementation, as shown in FIG. 1, the dimmer 100 includes one or more power cord receptacles 104 arranged to receive the power cord of a local appliance to be controlled ("the connected appliance"). For example, in an implementation, the power cord of the appliance is cut, and the two cut ends of the power cord are inserted into the two receptacles 104 of the dimmer 100, such that the dimmer 100 is installed in-line to the power cord.

In one embodiment, the dimmer 100 is retrofit to an appliance by installing the dimmer 100 inline to the appliance power cord. In another embodiment, the dimmer 100 is installed at a new appliance in like manner. In a further embodiment, the dimmer 100 is installed at a panel of the appliance, or the like, and inline coupled to a power supply conductor (which may not be visible) of the appliance.

In various implementations, the dimmer 100 may also include one or more ports 106 for interfacing with the dimmer 100. For example, the port(s) 106 may include USB®, Firewire®, RS232, RJ45, and so forth. In such examples, data and/or control signal(s) may be exchanged between the dimmer 100 and a remote device (such as a personal computer, home automation terminal, etc.).

Figure 2:
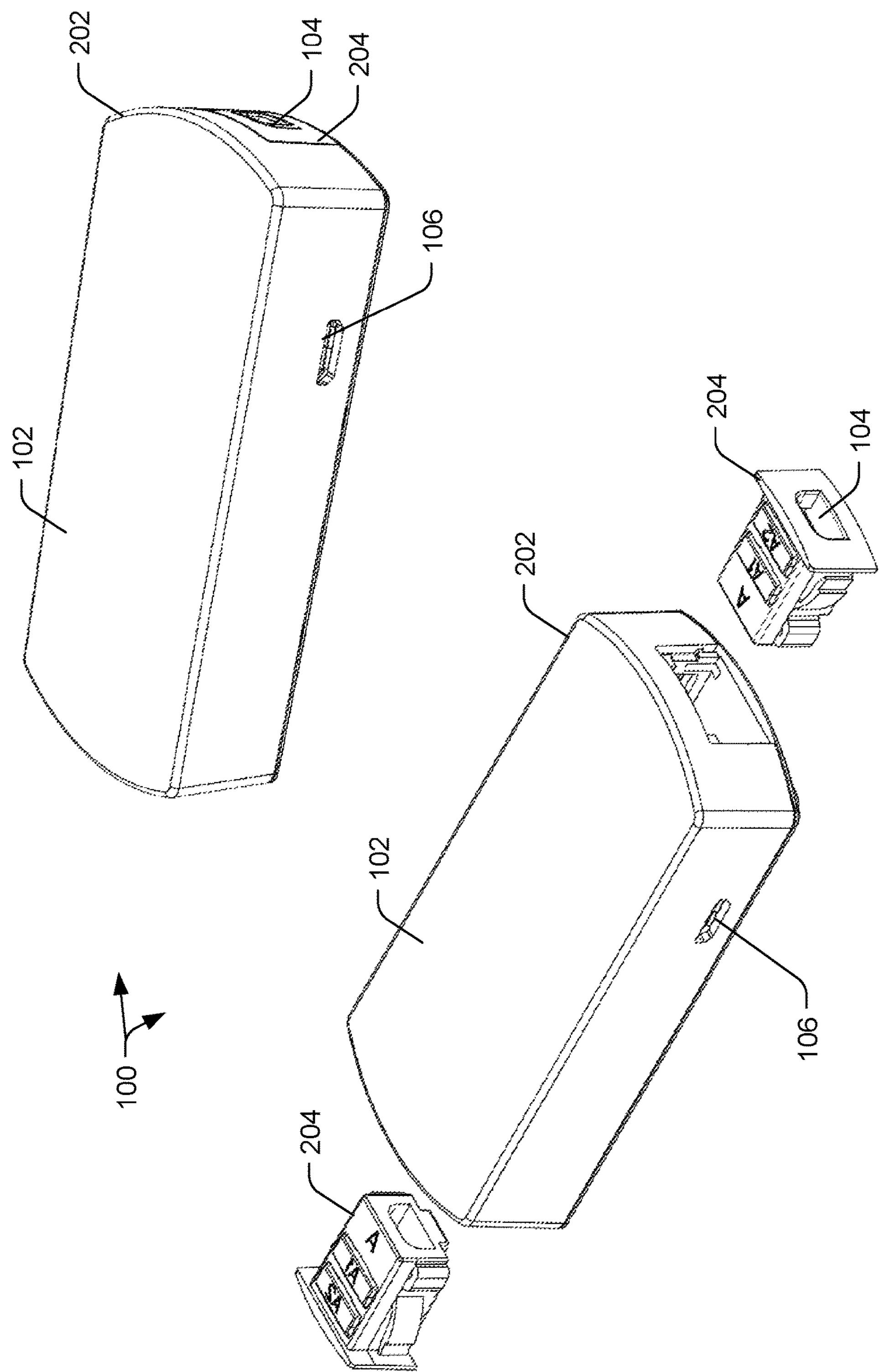
FIG. 2 illustrates two views of an example load control device assembly, according to an embodiment. One of the views shows example interchangeable sleeve modules.

FIG. 2 illustrates an example enclosure 202 for a dimmer 100, according to an embodiment. In various embodiments, the enclosure 202 may have a variety of form factors, shapes, dimensions, designs, and the like. As also shown in FIG. 2, in some embodiments, the dimmer 100 may include one or more interchangeable sleeve modules ("sleeves") 204, for receiving the power cord of an appliance to be controlled. In an implementation, as discussed further below, the use of interchangeable sleeves 204 allows the dimmer 100 to be used with or adapted to multiple different types of power cords. Thus, the sleeves 204 also can function as adapters.

For example, if the dimmer 100 is to be used in North America, a first type of sleeve 204 may be inserted into the enclosure 202 of the dimmer 100, where the first type of sleeve 204 accommodates (e.g., is the proper size, shape, and configuration) the common types and designs of power cords for appliances used in North America. If however, the dimmer 100 is to be used in some European regions, a second type of sleeve 204 is inserted into the enclosure 202 instead, where the second type of sleeve 204 accommodates (e.g., is the proper size, shape, and configuration) the common types and designs of power cords for appliances used in the particular European region. In various embodiments, the dimmer 100 includes multiple sleeves 204 for adapting the dimmer 100 to connected loads of multiple geographical regions.

FIG. 2 illustrates an example arrangement where the interchangeable sleeves 204 may be inserted and/or removed from the enclosure 202. In an embodiment, as discussed further below, the sleeves 204 align the connected appliance power cord, which is inserted into the receptacle 104, to electrical contacts within the enclosure 202.

Figure 3:
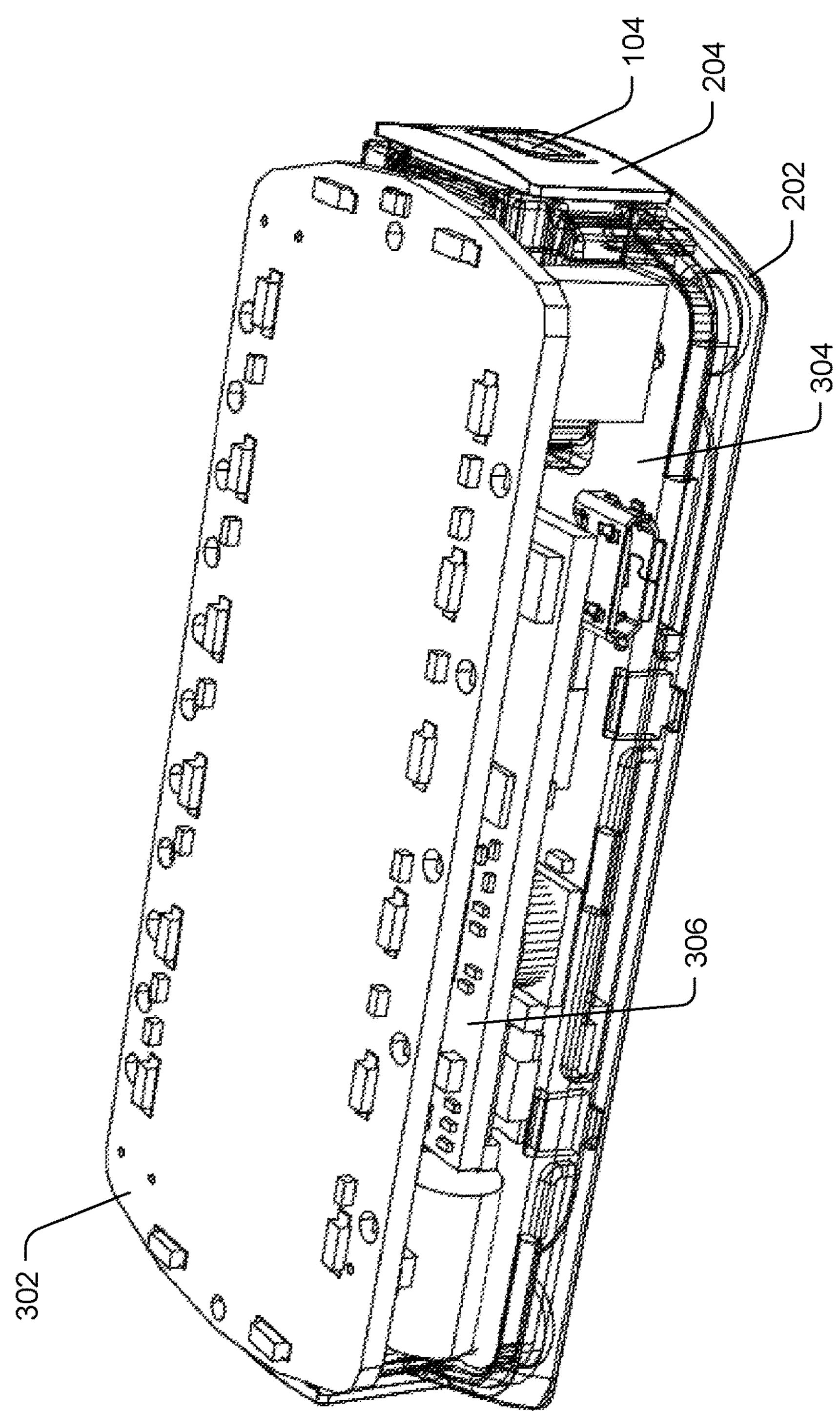
FIG. 3 is a view of example boards or portions of the example dimmer assembly, according to one embodiment.

FIG. 3 is a view of example boards (or portions) of the example dimmer 100, according to one embodiment. In an implementation, as shown in FIG. 3, the dimmer 100 includes a user interface (UI) board 302, a variable intensity (e.g., dimmer) board 304, and a communication (e.g., radio) board 306. In alternate implementations, the dimmer 100 includes additional or alternate portions or boards, arranged to provide the functions described. Further, in some embodiments, two or more of the portions or boards are combined on a single board or otherwise integrated.

In an implementation, the UI board 302 receives the input from the UI 102, and relays the input commands to other portions of the dimmer 100 for initiation of control signals. Additionally, the UI board 302 may receive signals from portions of the dimmer 100, and activate indicators or displays mounted to the UI board 302 or integral to the UI 102.

In one embodiment, the dimmer board 304 is arranged to provide control of power output to the connected appliance, based on user input to the UI board 302. For example, the power output to the connected load (e.g., the connected appliance) may be varied by the dimmer board 304, resulting in a desired intensity of operation of the connected load.

In another implementation, the dimmer board 304 is arranged to provide (e.g., generate, etc.) one or more control signals based on the user input to the UI board 302. In various embodiments, the control signal(s) have varied characteristics or properties to represent a desired intensity of operation (including fully on and off) of the controlled appliance(s). In other words, the dimmer board 304 is arranged to generate a control signal having a characteristic (e.g., magnitude, polarity, frequency, etc.) that is associated with the desired intensity of a controlled appliance.

In one example, a magnitude of the control signal is associated with the desired intensity, and a higher magnitude represents a greater intensity. In an alternate example, a higher magnitude represents a lesser intensity. In a further example, a frequency of the control signal is associated with the desired intensity and a higher frequency represents a greater intensity, and so forth.

In one implementation, the dimmer board 304 is arranged to adjust (e.g., attenuate or increase, etc.) the power output on the power lead connected to the local appliance and inserted into the dimmer 100, based on the input received by the UI board 302. For example, the dimmer board 304 may decrease or increase the voltage, the amperage, the power curve, etc. to the appliance attached to the power lead, based on the input at the UI board 302.

Figure 4:
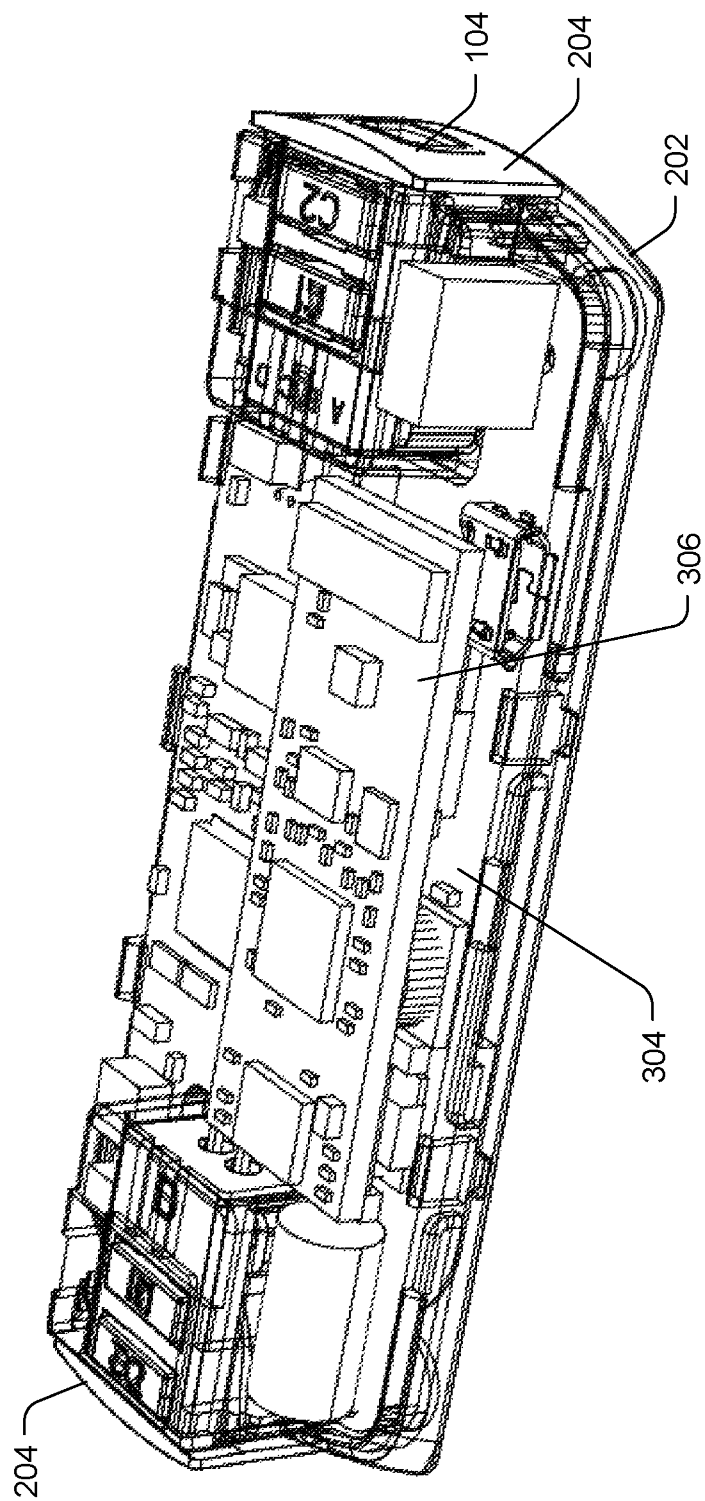
FIG. 4 is a view of an example communication portion, according to an embodiment.

In an implementation, the radio board 306 is arranged to transmit the one or more control signal values generated by the UI board 302 and/or the dimmer board 304 to a remote control or automation system and/or to one or more remotely controlled appliances. (In some implementations, the control signal(s) generated by the UI board 302 may pass directly to the radio board 306 for communication, without going through the dimmer board 304, for instance.) FIG. 4 shows a view of an example radio board 306, according to an embodiment. In various implementations, the radio board 306 includes various electronic components for wireless communication according to one or more technologies and/or protocols.

In another implementation the radio board 306 is arranged to receive (e.g., wireless) control instructions from a remote control or automation system that defines the desired power output to the connected appliance. In the implementation, the radio board 306 can transmit those instructions to the dimmer board 304 with the purposes of the dimmer board 304 changing the output power to the desired level, and to communicate the corresponding values to the UI board 302 for synchronization. Further, the radio board 306 can transmit status information back to the remote control or automation system.

Figure 5:
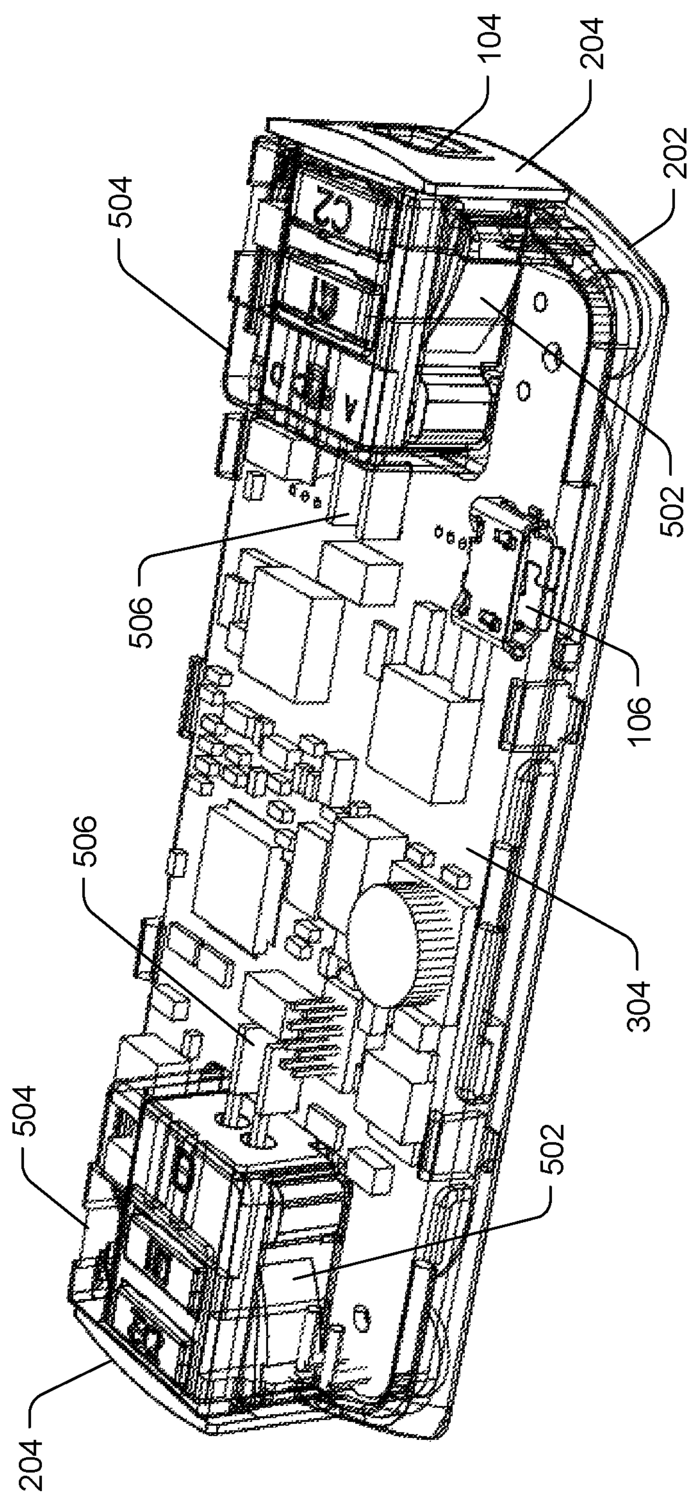
FIG. 5 is a view of example components mounted to a dimmer portion, according to an embodiment, including one or more interchangeable sleeves.

FIG. 5 is a view of example components mounted to a dimmer board 304, according to an embodiment. As shown in the illustration of FIG. 5, the dimmer board 304 includes one or more interchangeable sleeve modules ("sleeves") 204. The sleeves 204 are shown inside sleeve ports 504 (e.g., sockets) to show detail.

Figure 6:
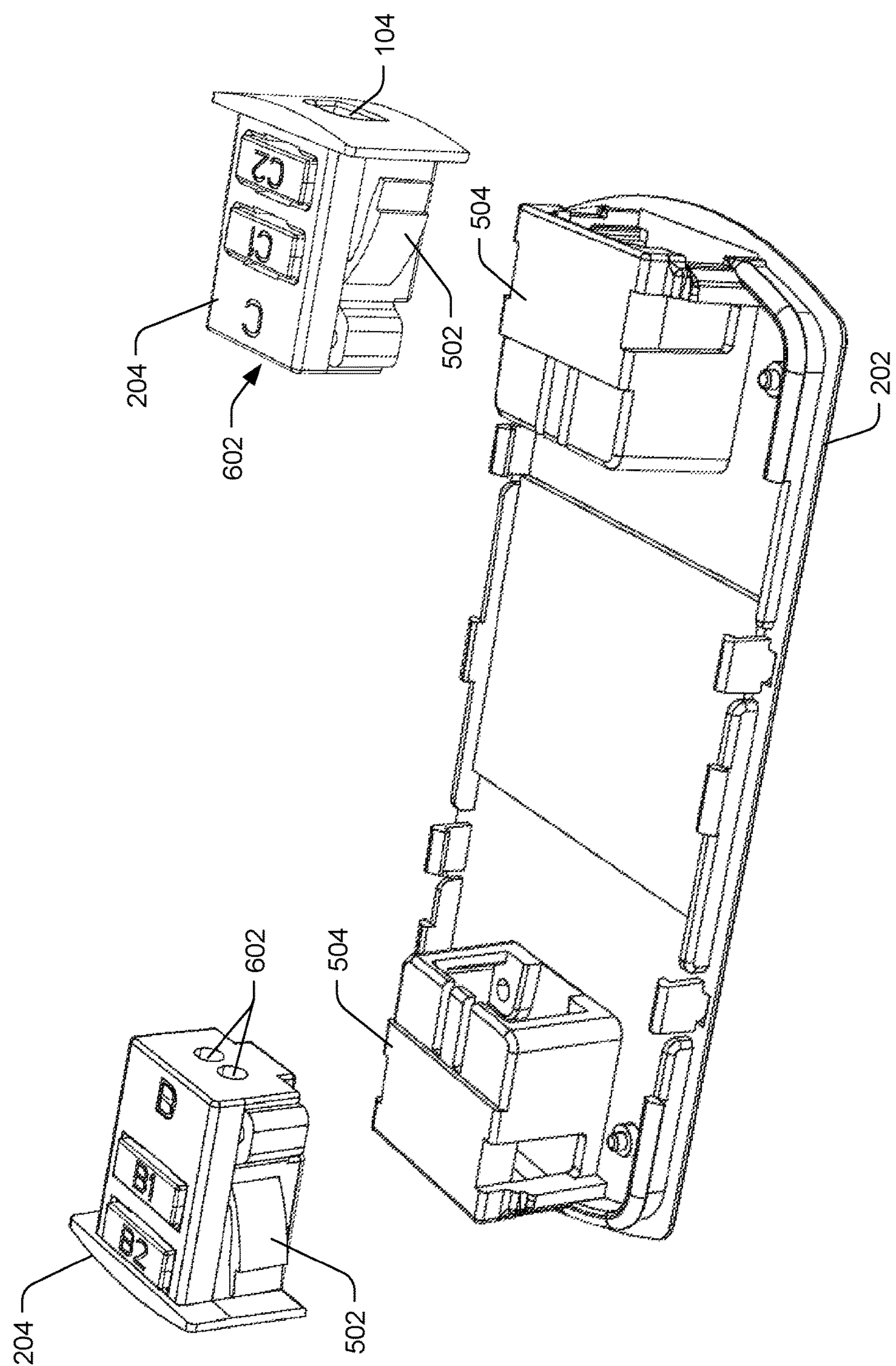
FIG. 6 illustrates a view of the enclosure and sleeve ports, as well as the sleeves, of an example load control device.

FIG. 6 illustrates a view of the enclosure 202, including the sleeve ports 504 shown to provide additional detail. Example sleeves 204 are also illustrated, removed from the ports 504.

Referring to FIGS. 5 and 6, in an implementation, the sleeves 204 include the power cord receptacles 104 and are arranged to couple the dimmer 100 in series with the power lead of a connected appliance. For example, the sleeves 204 are arranged to couple the power lead of an appliance (via the receptacles 104) to the dimmer board 304 via connector pins 506. In various implementations, the dimmer board 304 may include additional pins 506 (e.g., for a ground conductor, etc.). Further, the dimmer board 304 illustrated, as well as all of the boards/portions illustrated are shown as examples, and may include fewer, additional, or alternate components.

In an implementation, the one or more interchangeable sleeve modules 204 are arranged to interface with the dimmer board 304 via the ports 504. For example, in various implementations, the sleeves 204 are arranged to plug into the ports 504, engaging with one or more connecting devices, such as the arresting hooks 502 shown in FIGS. 5-7, other spring-loaded catches, tabs, or the like. Further, in some embodiments, the sleeves 204 may be removed from the ports 504 by disengaging the arresting hooks (or the like) from the port 504, for interchanging the sleeves 204, for example. Accordingly, in various implementations, the sleeves 204 are removable and interchangeable plugs for coupling (and adapting) various types of power leads to the dimmer board 304.

Thus, the sleeves 204 are secured to the dimmer board 304, and aligned for engaging the power lead of the connected appliance with the connector pins 506 of the dimmer board 304. In alternate implementations, the ports 504 may be molded as part of the enclosure 202, they may be coupled to the enclosure 202, they may be coupled to the dimmer board 304, or the like. Further, the dimmer board 304 (and/or the other boards 302, 306) can be secured to the enclosure 202, for example.

In various implementations, the sleeves 204 include one or more exit openings ("exits") 602. In the implementations, the exits 602 are formed to conform to the shape and size of one or more of the individual conductor portions of the power lead to the connected appliance. The exits 602 facilitate the alignment of the power lead to the pins 506, for electrical and mechanical connection of the power lead to the dimmer board 304. For example, an exit 602 of a sleeve 204 may include one opening shaped to conform to a first power lead having two separate conductors molded together as a cord (such as US SPT2 wire, for example), where the two conductors (within their respective insulator coverings) remain together as they are aligned by the exit 602, toward the pins 506.

In another example, as shown in FIG. 6, the exits 602 of a sleeve may include two openings shaped to conform to a second power lead having two separate conductors sheathed together as a cord (such as European round cords such as type H03VV-F, for example), where the two conductors (within their respective insulator coverings) are separated as they are aligned by the exits 602, toward the pins 506. In further implementations, the quantity, shape, and size of the exits 602 of a sleeve 204 may vary based on the type and design of the power lead of the connected appliance. Since the sleeves 204 are interchangeable, sleeves 204 having a desired receptacle 104 and the desired exits 602 may be selected to be inserted into the ports 504 of the dimmer 100 during installation of the dimmer 100, based on the power lead.

In an implementation, the terminal pins 506 pierce the electrical conductor portion of the power lead (at the cross-section of the cut end of the power lead) when the power lead is aligned within the sleeve 204, to form a secure and reliable electrical connection. In the implementation, the terminal pins 506 may not pierce the insulation (or sheath) of the power lead. In alternate implementations, the terminal pins may pierce the power lead in a different manner (e.g., at an angle, in a hooked manner, etc.) to increase the mechanical or electrical coupling of the pins 506 to the power lead.

Figure 7:
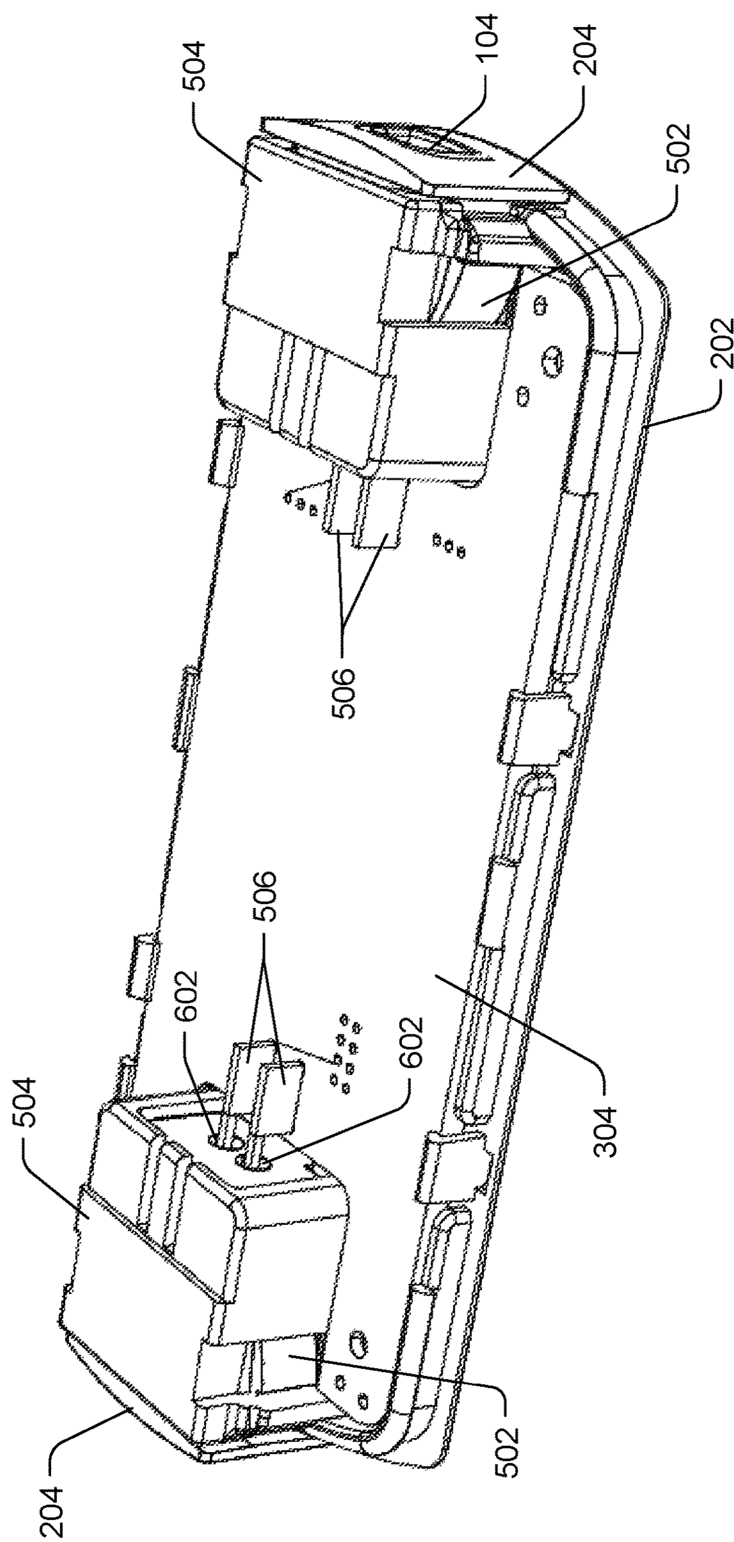
FIG. 7 illustrates a view of a dimmer board installed in an enclosure, including interchangeable sleeves inserted into ports, according to an embodiment.

FIG. 7 illustrates a view of the dimmer board 304 installed within the enclosure 202, with most of the components of the dimmer board 304 removed for clarity. In an implementation, as shown in FIG. 7, the connector terminal pins 506 are mechanically and electrically coupled to the dimmer board 304, and positioned to penetrate the exits 602 when the sleeves 204 are inserted into the ports 504. With the exits 602 formed to conform to the shape and size of a particular power lead type and design, the conductors of the power lead are aligned within the exits 602 and the pins 506 are positioned to penetrate the separate conductors of the power lead, making sure electrical and mechanical connections to the conductors.

In an implementation, the pins 506 are coupled to the dimmer board 304 at preset locations, and the sleeves 204 (based on the exits 602) are arranged to guide the conductors of the power lead, aligning the conductors with the pins 506 when the sleeves 204 are inserted into the ports 504. In the implementation, the alignment of the conductors to and the sure connection to the pins 506 is accomplished with each of the different interchangeable sleeves 204, when used with an associated design and type of power lead. This arrangement facilitates the use of the dimmer 100 with various different appliances, in various geographical regions, by selection of interchangeable sleeves 204 to accommodate the power lead of the appliances to be connected to the dimmer 100.

Figure 8:
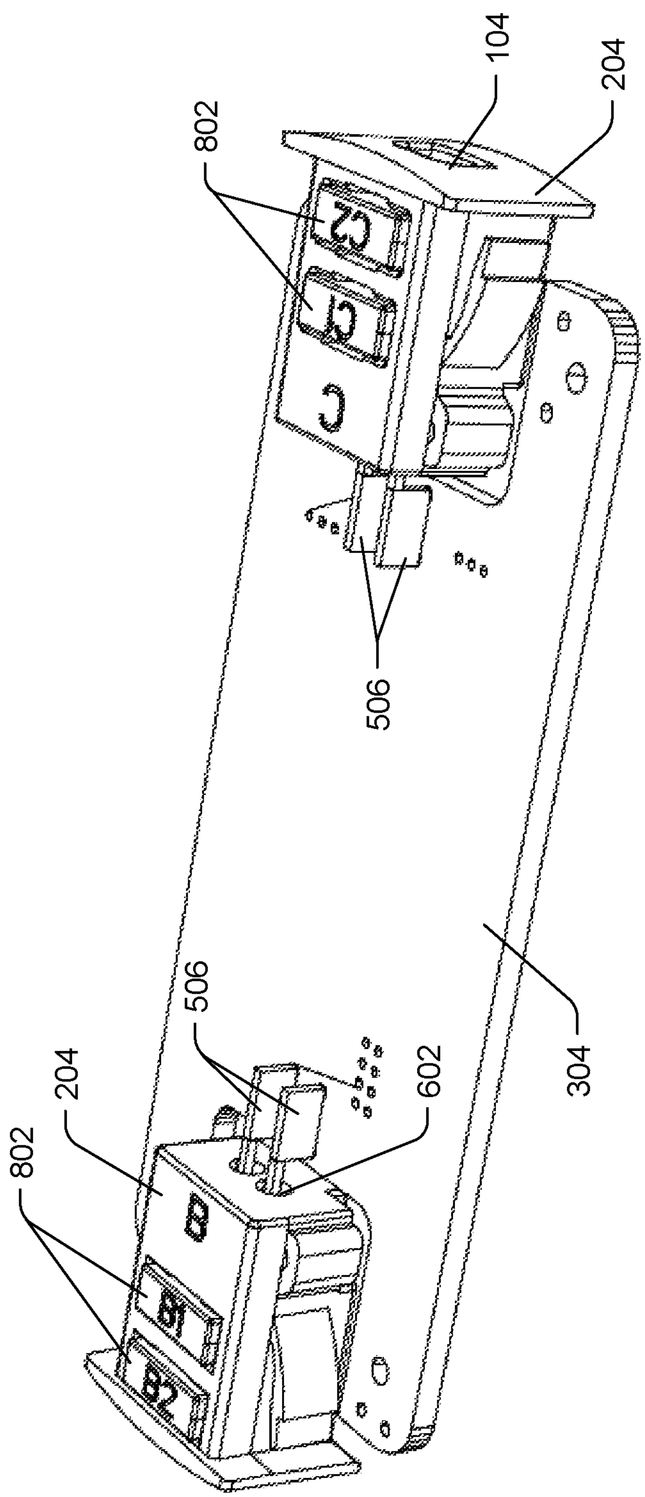
FIG. 8 illustrates a view of the dimmer board, including interchangeable sleeves and connector terminals, according to an embodiment.
Figure 9:
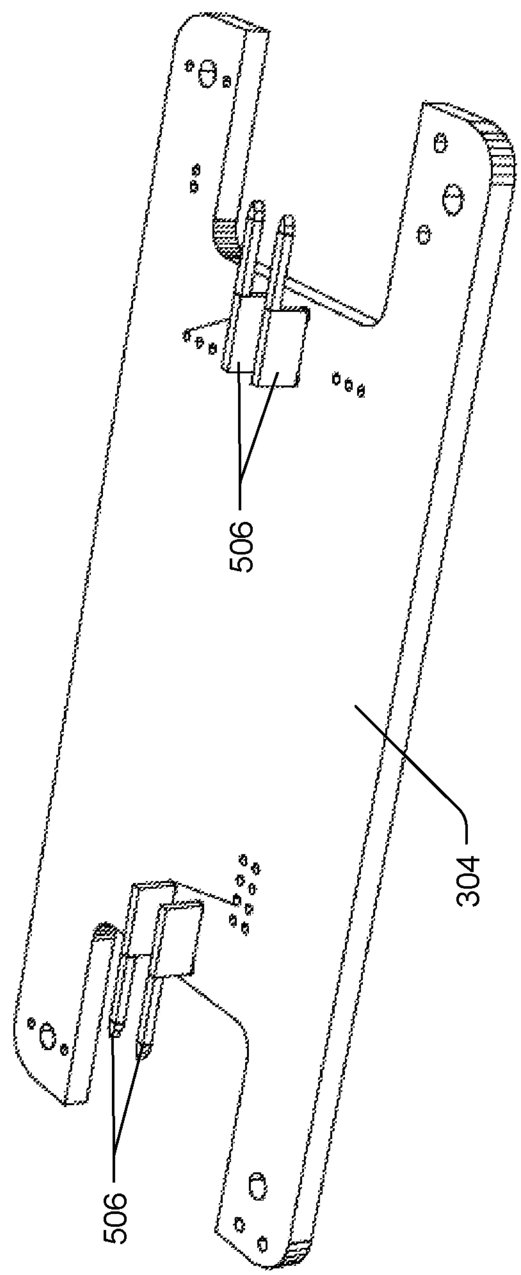
FIG. 9 illustrates a view of a dimmer board with connector terminals, according to an embodiment.

FIG. 8 illustrates a view of the dimmer board 304, including the interchangeable sleeves 204 and the terminal pins 506. In an embodiment, as shown in FIG. 8, the sleeves 204 are aligned to the terminal pins 506. In the embodiment, the sleeves 204 are arranged to receive and to position the power lead (via inserting the power lead into the receptacle 104 and extending the conductors of the power lead through the exits 602) for engagement with the electrical terminal pins 506 of the dimmer board 304. FIG. 9 illustrates a view of the dimmer board 304 with the connector terminal pins 506 physically and electrically coupled to the dimmer board 304, according to an embodiment.

Figure 10:
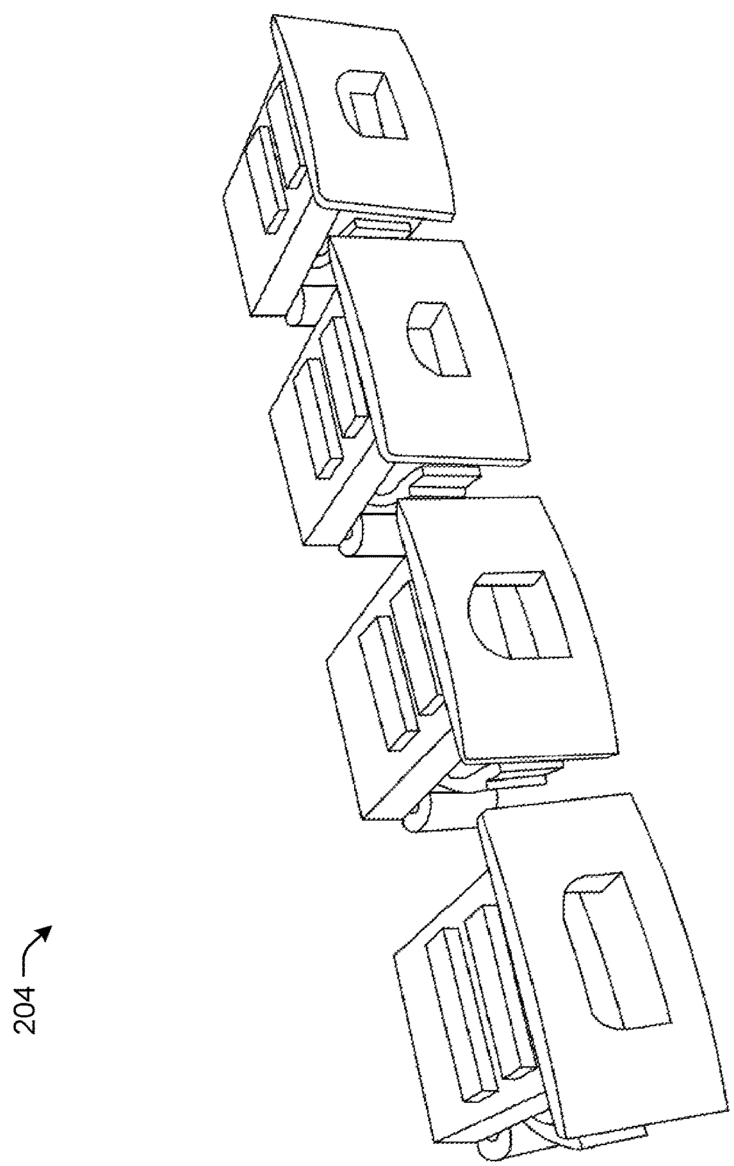
FIG. 10 illustrates a few examples of interchangeable sleeves according to various embodiments.

In various implementations, as shown in FIG. 10, different designs of interchangeable sleeves 204 may be provided to accommodate different types and designs of power leads, where each of the different sleeves 204 interfaces with the dimmer board 304 in a like manner (e.g., engage with the port 504, for example). In the implementations, the interchangeable sleeves 204 may be selected according to a design or type of the power lead, such that the power lead is correctly positioned onto the terminal pins 506. In the implementations, the receptacles 104 are "cord guides" arranged to interface with predetermined designs of power leads. In other words, the receptacles 104 are shaped differently with different types of sleeves 204, to guide and align the different types of power leads into the correct position for engaging with the terminal pins 506 (via the exits 602).

Figure 11:
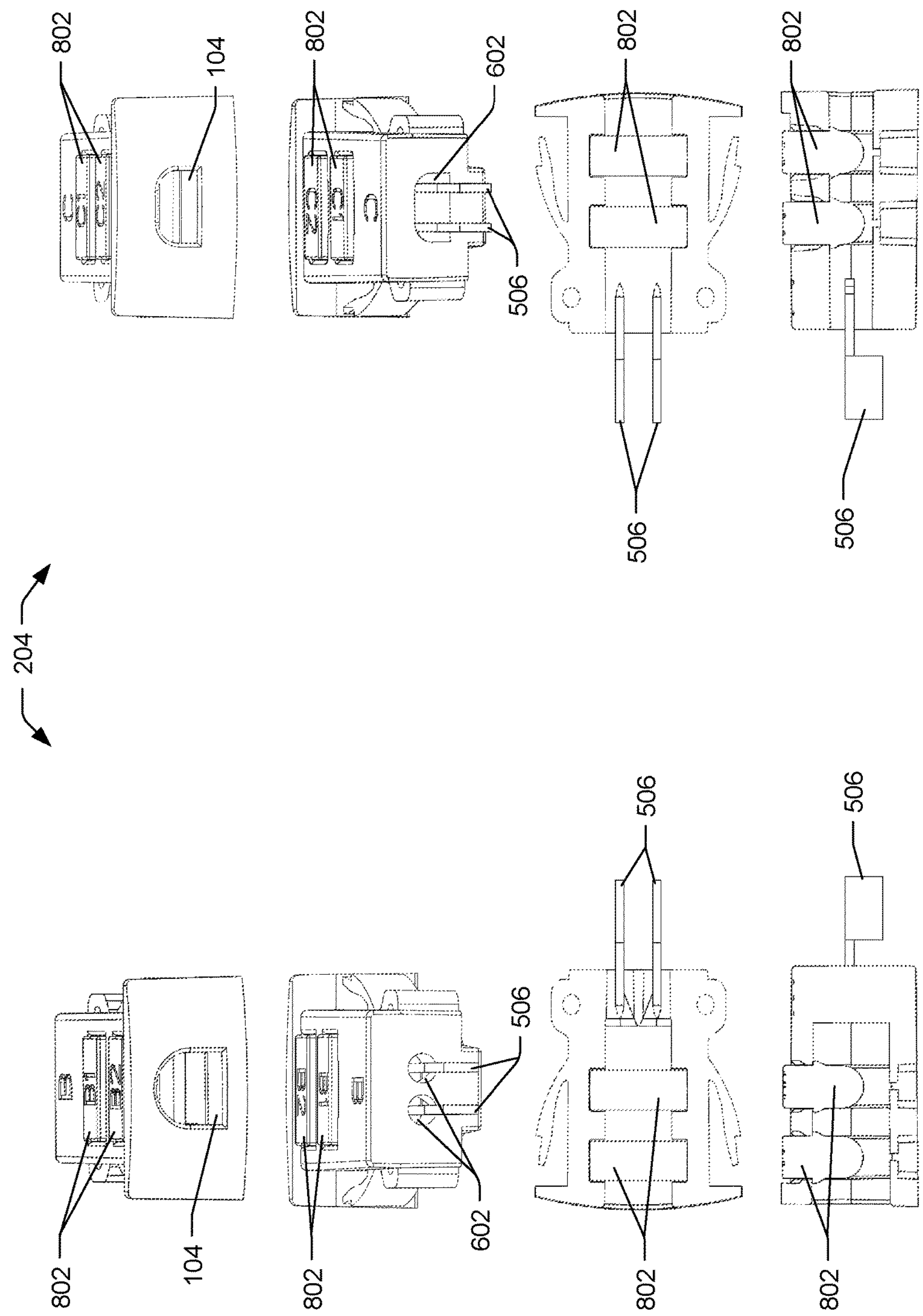
FIG. 11 illustrates several views of example interchangeable sleeves, according to various embodiments.

FIG. 11 illustrates several views of example interchangeable sleeves 204, according to various embodiments. For example, one type of sleeve 204 (used in European applications, for example) is shown in various views on the left side of FIG. 11 and another type of sleeve 204 (used in North American applications, for example) is shown in various views on the right side of FIG. 11.

Proceeding from the top to the bottom of FIG. 11, the first view shows the receptacle 104 side of the sleeves 204, the second view shows the output side of the sleeves 204 with the exits 602, the third view shows a cross-section from the top side down of the sleeves 204, and the fourth view shows a cross-sectional side view of the sleeves 204. As can be seen in the views of FIG. 11, the sleeves 204 and receptacles 104, as well as the exits 602 and other portions of the sleeves 204, may be sized and shaped differently to accommodate different types of power leads. Particularly, the different sizes and/or shapes may be used to properly align the power leads to engage with the pins 506 and to securely couple the power lead to the sleeve 204.

In an embodiment, as shown in FIGS. 8 and 10-15, the dimmer 100 may include one or more compression fittings to secure the power lead to the dimmer 100. For example, in various implementations, the compression fittings may be arranged within an enclosure 202 of the dimmer 100 (not shown) and/or within the one or more interchangeable sleeves 204, as shown in FIGS. 8 and 10-15. In an embodiment, the compression fittings may be arranged to secure the power lead to the dimmer board 304.

In various implementations, as shown in FIGS. 8 and 10-15, the compression fittings include one or more recessed portions 1202 and one or more associated plungers 802. For example, as shown in FIGS. 8 and 10-15, the compression fittings may be operated by fully inserting the power lead (e.g., 1206) into the receptacle 104 of the sleeve 204 and pressing the plungers 802 onto the power lead. For example, the plungers 802 may be inserted or pre-loaded into a cavity 1502 in preparation for compression onto the power lead. In an implementation, the plungers 802 are not activated using a special tool, and may be pressed using a common tool, such as an adjustable pliers, for example. In another implementation, the plungers 802 lock into a compressed position using tabs, notches, barbs, or the like (i.e., tabs 1208, for example), when pressed to a predetermined depth.

Figure 12:
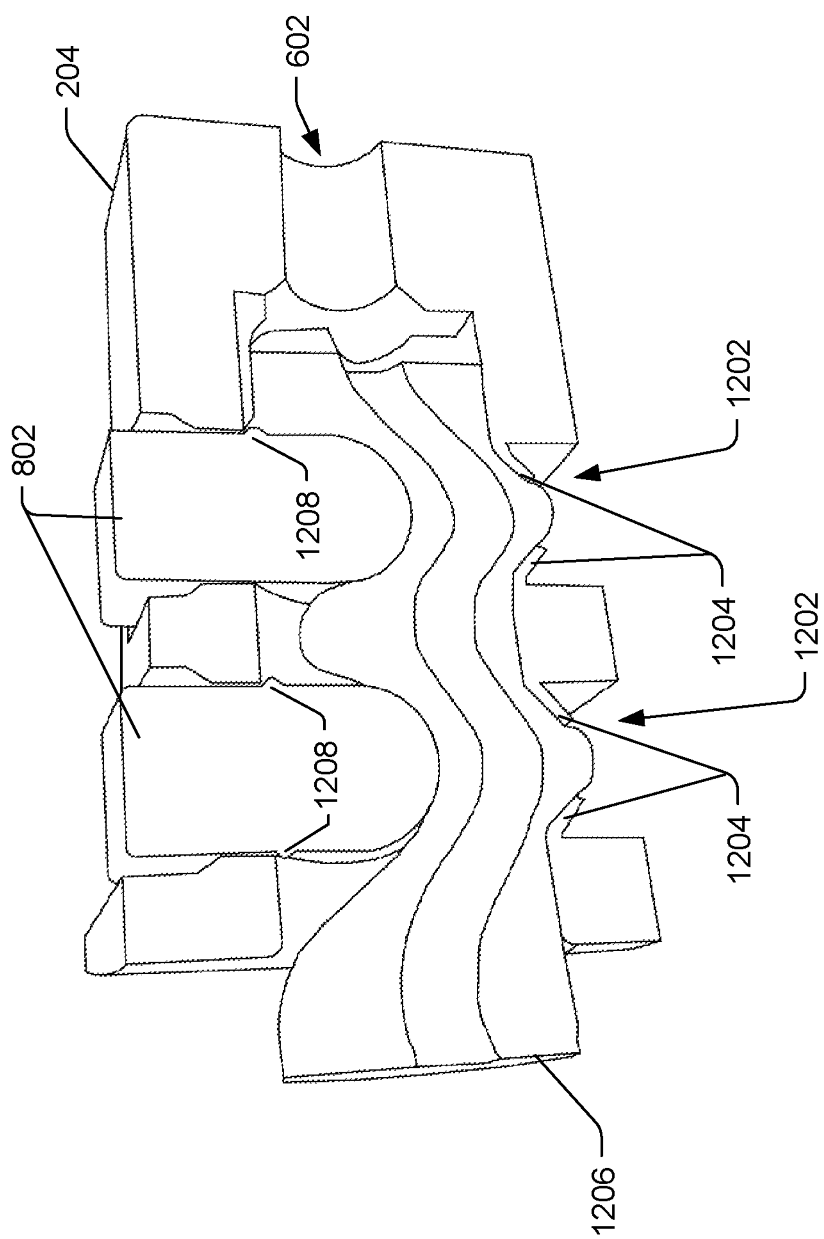
FIG. 12 illustrates a cross-sectional view of an example interchangeable sleeve with a secured power lead, according to various embodiments.

The recessed portions 1202 are arranged to allow the power lead to deform under pressure during compression of the plungers 802 onto the power lead. In various implementations, as shown in FIG. 12, the pressure of the plungers 802 and the resulting deformation of the power lead into the recessed portions 1202 secures the power lead to the sleeve 204, and thus, to the dimmer board 304. In various embodiments, the plunger 802 length and shape (including the position and/or shape of the tabs 1208) for a sleeve 204 may be specific to an intended power lead type and design. For example, the plungers 802 may be formed to have a particular force on the power lead when pressed into the compressed position to securely hold the power lead in place without damaging the power lead. In alternate implementations, the sleeves 204 may be coupled to the dimmer board 304 (via the ports 504) either prior to or after inserting and securing the power lead to the sleeves 204.

In embodiments having one or more compression fittings, the power lead is not stripped prior to insertion of the power lead into the sleeve 204. Further, the power lead is securely coupled to the dimmer 100 without screwing the power lead to screw terminals, or the like. In alternate implementations, the sleeves 204 may be arranged to accept power leads having three or more conductors (e.g., for hot, neutral, and ground, for example). In such implementations, the dimmer board 304 (or another board) may include additional pins configured to engage the additional conductors.

Figure 13:
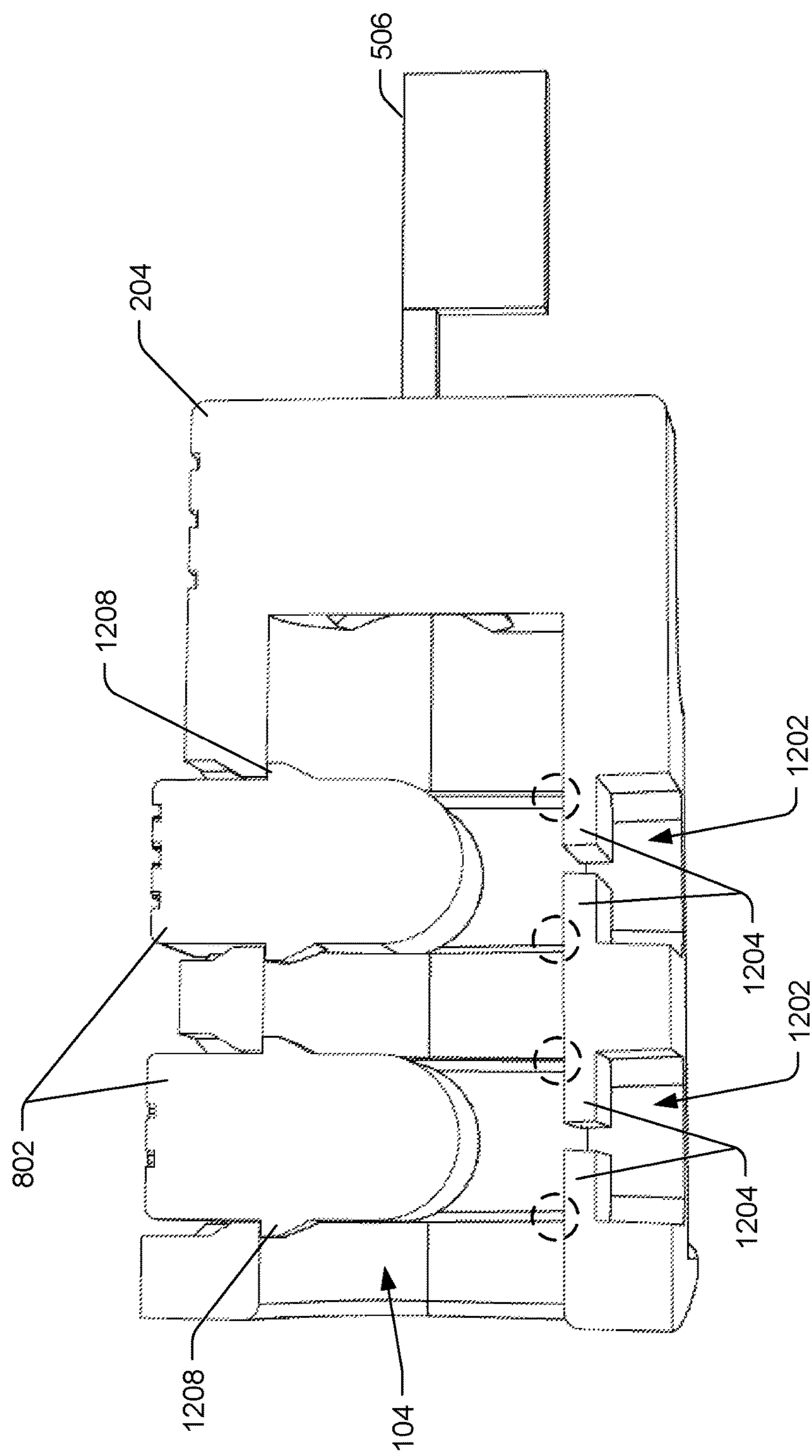
FIGS. 13 and 14 are section views of an example interchangeable sleeve, according to an embodiment. The illustrations show interior recesses and cavities, as well as one or more plungers.
Figure 14:
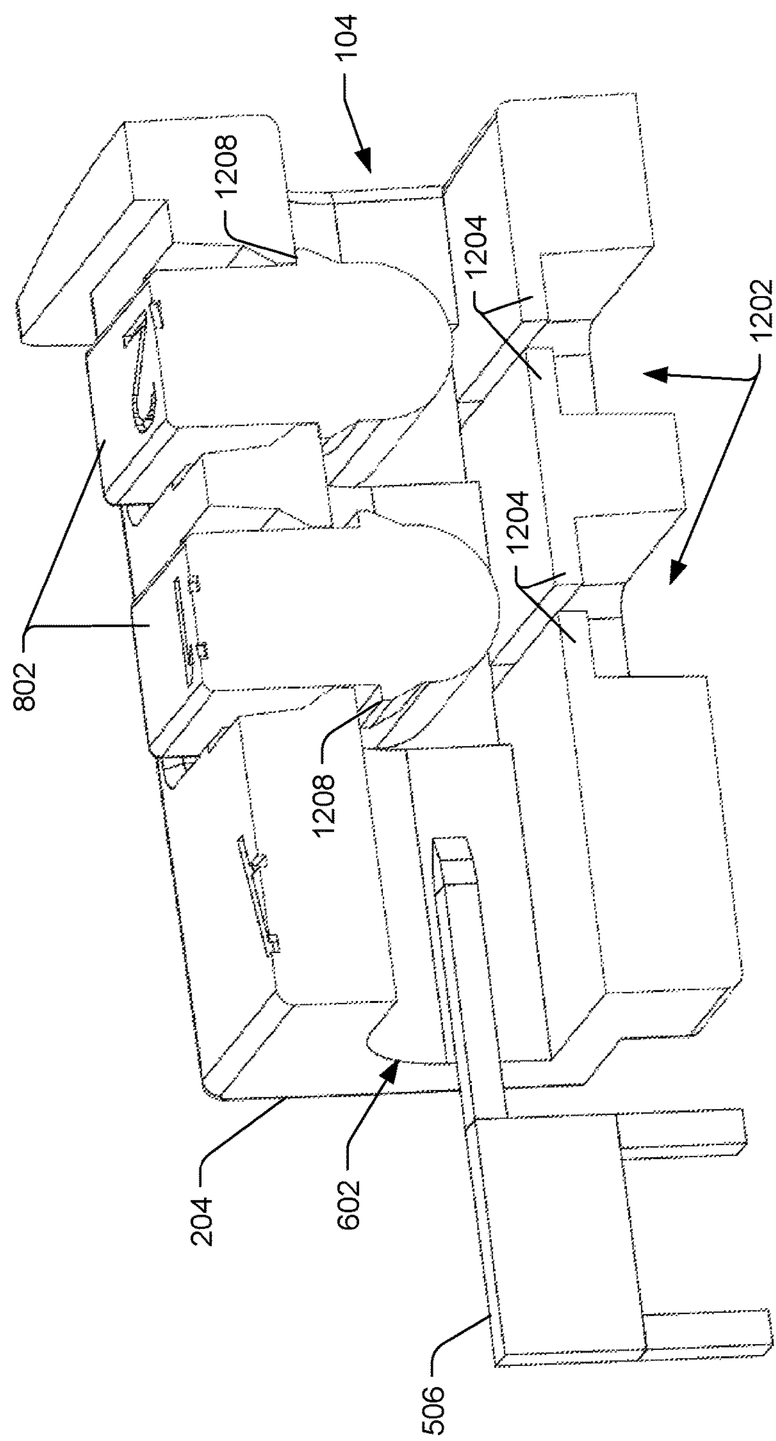

FIGS. 12-14 are cross-sectional views of an example interchangeable sleeve 204, according to various embodiments. The illustrations include detail of interior recesses 1202, cavity (i.e., receptacle) 104, exits 602, tabs 1208, as well as one or more plungers 802. In an implementation, as shown in FIGS. 12-14, the sleeve 204 includes a flexible skin 1204 (molded extension, etc.) arranged to protect the sheath of the power lead from abrasion. As shown, the skin 1204 may comprise an additional molding of the sleeve 204 material, partly extending over the recesses 1202.

To avoid damage to the power lead sheath by the two resulting non-radiused right angle edges (indicated in FIG. 13 with dashed circles) of the recess 1202, the recess 1202 is not completely open. Rather, the recess 1202 is partly covered (except for a slot) by the thin remnant skin 1204. This molded skin gives way under pressure, bending down into the recess 1202, and in so bending, presents the power lead with a radiused edge that is gentle on the power lead sheath, and thus prevents damage to the power lead sheath when it is pressed into the recess 1202. (This is shown in FIG. 12.)

Figure 15:
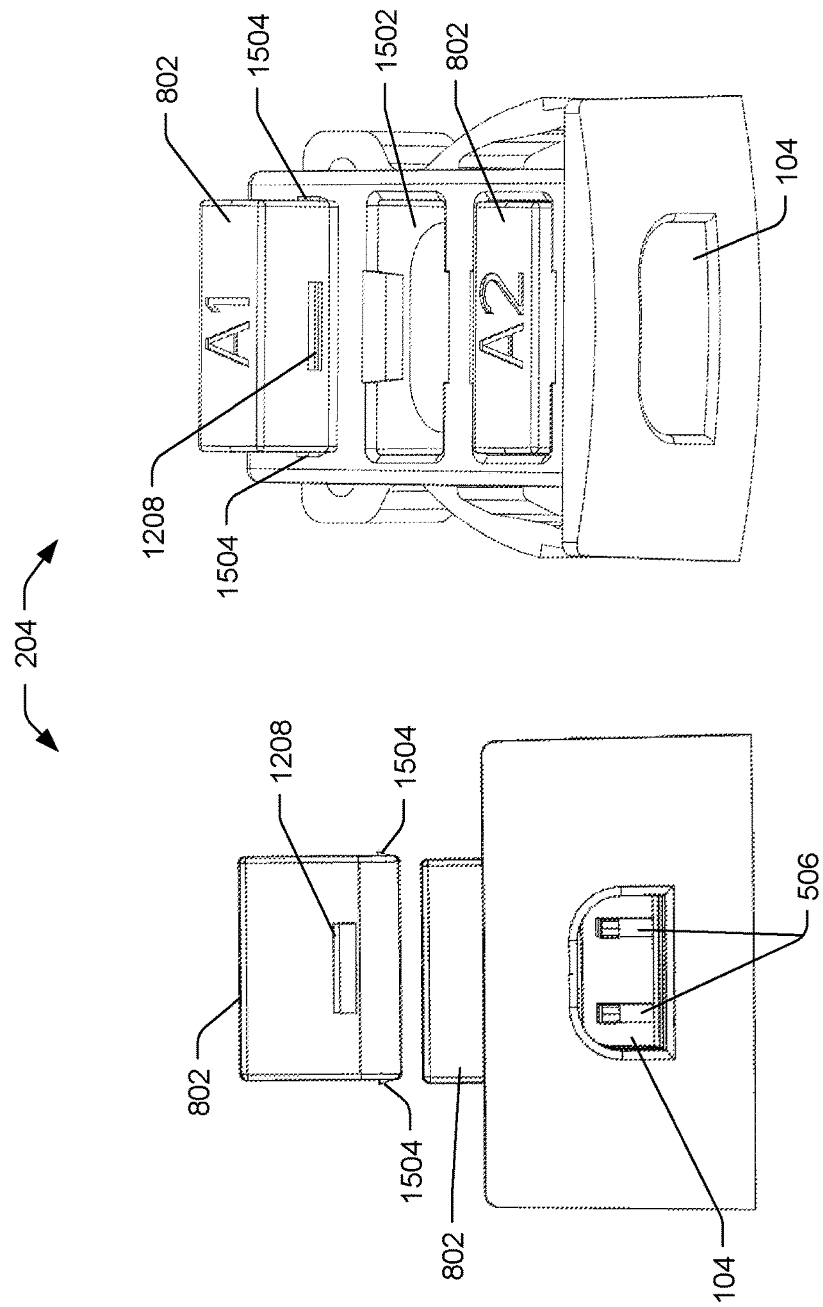
FIG. 15 is a couple of front views of an example interchangeable sleeve, according to an embodiment. The illustration shows a plunger having one or more barbs arranged to maintain a position of the plunger in one or more configurations.

FIG. 15 shows a couple of front views of an example interchangeable sleeve 204, from a level point of view, and a view slightly raised at the rear of the sleeve 204, according to an embodiment. The illustrations of FIG. 15 show some details of plungers 802, with respect to a sleeve 204. In an implementation, one or more of the plungers 802 have one or more barbs 1504 arranged to maintain a position of the plunger 802 in one or more configurations. For example, the plunger 802 includes the barbed portion 1504 arranged to position the plunger 802 in a preparatory position and/or in a compressed position. The barbs 1504 can engage the side wall of the sleeve 204, from within the cavity 1502, for example, to hold the plunger 802 in a desired position.

In various implementations, the barbs 1504 can allow sleeves 204 to be pre-assembled with matching plungers 802, with the plungers 802 held in a preparatory position within the sleeves 204, prior to wire insertion. Further, the barbs 1504 may be arranged to hold the plungers 802 in a compressed position after installation of a power lead into the sleeve 204.

Different configurations for a dimmer 100 may be possible with different implementations. In alternate implementations, various other combinations and designs of the dimmer 100 are also within the scope of the disclosure. The variations may have fewer elements than illustrated in the examples shown in FIGS. 1-15, or they may have more or alternative elements than those shown.

Representative Process

Figure 16:
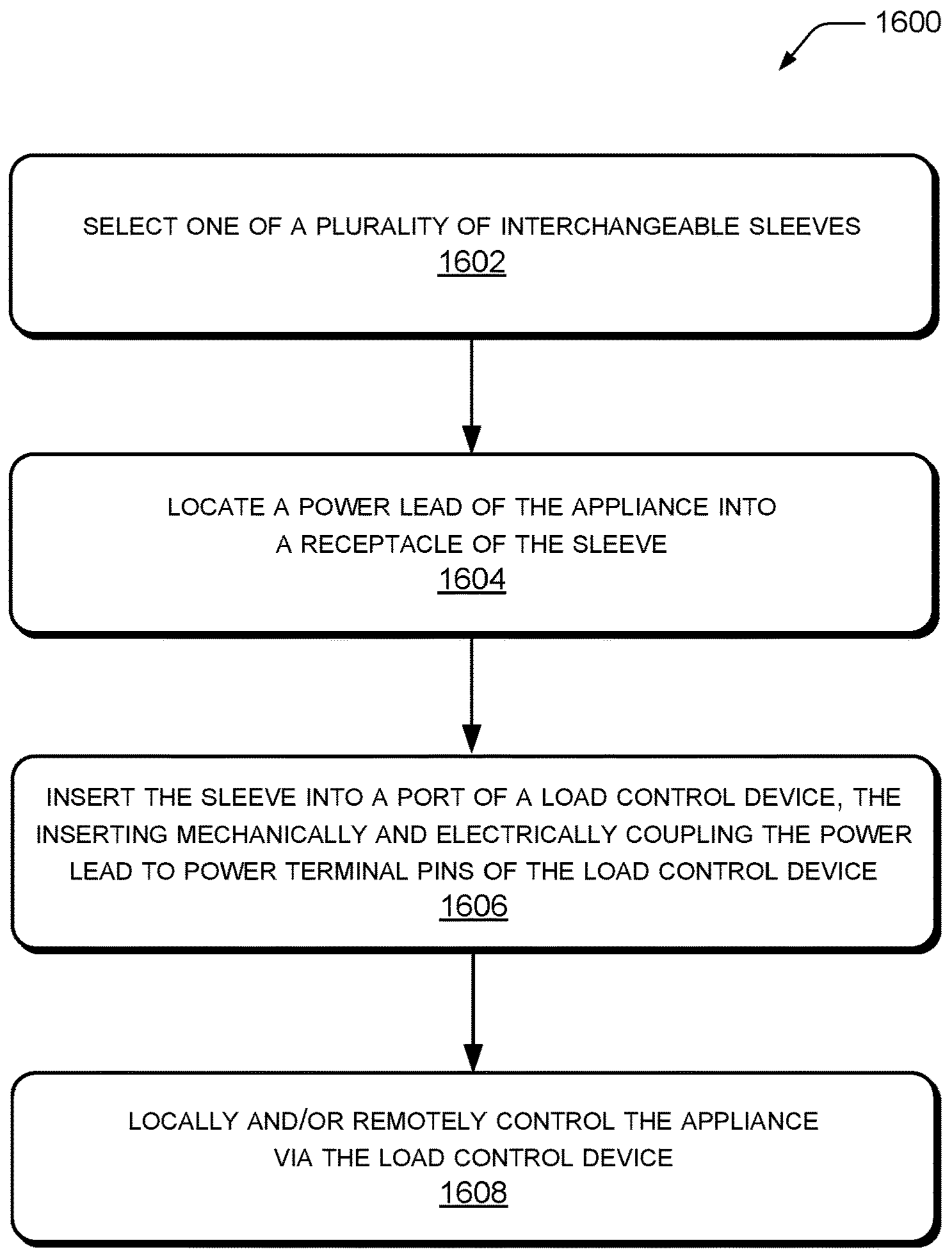
FIG. 16 is a flow diagram illustrating an example process of controlling an appliance using a load control device, according to various implementations.

FIG. 16 is a flow diagram illustrating an example process 1600 for providing remote control to an appliance using a load control device (such as dimmer 100, for example), according to an implementation. The process 1600 is described with reference to FIGS. 1-15.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 1602, the process includes selecting one of a plurality of interchangeable sleeves (such as sleeves 204, for example). In various implementations, the sleeve(s) are selected based on the configuration (type, design, etc.) of the power lead of the appliance to be connected to the load control device. In the implementations, the plurality of sleeves includes sleeves configured to conform to various types and designs of power leads (based on the shape and size of input and output openings of the sleeves, for example.

At block 1604, the process includes locating a power lead of the appliance into a receptacle (such as receptacle 104, for example) of the sleeve. For example, the power lead may be cut in some cases, and a cut end of the power lead is inserted into the receptacle of the sleeve.

In an implementation, the process includes compressing the power lead via one or more compression fittings of the sleeve to secure the power lead to the sleeve.

At block 1606, the process includes inserting the sleeve into a port of a load control device. In an implementation, the inserting includes mechanically and electrically coupling the power lead to power terminal pins of the load control device. In an embodiment, the inserting couples the load control device to the appliance in-line with the power lead of the appliance.

In another implementation, the process includes aligning the power lead to the terminal pins of the load control device based on an internal configuration of the sleeve, the internal configuration based on an intended power lead type for the sleeve.

In an implementation, the process includes selecting another of the plurality of interchangeable sleeves, locating another power lead (the other cut end, for example) of the appliance into a receptacle of the other sleeve, and inserting the other sleeve into another port of the load control device. In the implementation, the inserting mechanically and electrically couples the other power lead to additional power terminal pins of the load control device.

At block 1608, the process includes locally and/or remotely controlling the appliance via the load control device. For example, the process includes controlling an intensity of operation of the appliance via the load control device.

In alternate implementations, other techniques may be included in the process 1600 in various combinations, and remain within the scope of the disclosure.

Conclusion

While various discreet embodiments have been described throughout, the individual features of the various embodiments may be combined to form other embodiments not specifically described. The embodiments formed by combining the features of described embodiments are also load control devices.

What is claimed is:

1. An apparatus, comprising:

a user interface portion including a configurable capacitive touch panel arranged to receive user input via a plurality of capacitive touch controls arranged according to a selected configuration, and to initiate one or more control signals based on the user input;

a variable intensity portion including a variable-output electrical circuit coupled to the capacitive touch panel and arranged to provide separate control of power output to a hard-wired connected load and one or more unrelated remote loads with functions different than the hard-wired connected load, based on the user input, the power output being variable to result in a desired intensity of operation of the hard-wired connected load and the one or more unrelated remote loads; and a communications portion including a wireless radio coupled to the variable-output electrical circuit arranged to receive control communications including load control instructions from a remote control or automation system and to transmit the load control instructions to the variable-output electrical circuit.

2. The apparatus of claim 1, further comprising one or more interchangeable sleeve modules arranged to couple the apparatus in series with a power lead of the hard-wired connected load.

3. The apparatus of claim 2, wherein the one or more interchangeable sleeve modules is arranged to interface with the variable intensity portion of the apparatus and to receive and to position the power lead for engagement with electrical terminals of the variable intensity portion of the apparatus.

4. The apparatus of claim 2, wherein the one or more interchangeable sleeve modules are selected according to a physical shape and configuration of the power lead.

5. The apparatus of claim 1, wherein the user interface and the plurality of capacitive touch controls are arranged according to a selected configuration based on the hard-wired connected load and the one or more unrelated remote loads and are adapted to allow a user to exercise control over a connected appliance and over a remotely communicating device.

6. The apparatus of claim 5, wherein the variable-output electrical circuit is adapted to allow the user to exercise control over the connected appliance and over the remotely communicating device with or without the interposition of an automation system.

7. The apparatus of claim 1, wherein the communications portion is arranged to transmit status information back to the remote control or automation system.

8. The apparatus of claim 1, wherein the communications portion is arranged to transmit one or more control communications to one or more remotely controlled appliances and to the remote control or automation system.

9. The apparatus of claim 1, wherein the communications portion comprises a wireless radio transceiver arranged to transmit the one or more control signals to the one or more unrelated remote loads.

* * * * *